(12) United States Patent
Yamada et al.

(10) Patent No.: US 6,390,284 B1
(45) Date of Patent: May 21, 2002

(54) HANGING-DOWN JIG AND OVERHEAD CONVEYOR FOR MOTORCYCLE

(75) Inventors: Toshio Yamada; Toshihiro Tsuchiya; Norihisa Ohgi, all of Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,055

(22) Filed: May 18, 2000

(30) Foreign Application Priority Data

May 20, 1999 (JP) .......................................... 11-140291

(51) Int. Cl.[7] .............................................. B65G 17/32
(52) U.S. Cl. .................................. 198/687.1; 198/465.4
(58) Field of Search ........................... 198/465.1, 465.2, 198/465.4, 473.1, 485.1, 682, 687.1

(56) References Cited

U.S. PATENT DOCUMENTS

| | | | | |
|---|---|---|---|---|
| 2,792,927 | A | * | 5/1957 | Mullen et al. |
| 4,464,998 | A | * | 8/1984 | Wakabayashi |
| 4,522,380 | A | * | 6/1985 | Peddle |
| 5,649,618 | A | * | 7/1997 | Tetzloff |
| 6,112,858 | A | * | 9/2000 | Arnst |

FOREIGN PATENT DOCUMENTS

| | | | |
|---|---|---|---|
| JP | 4-64508 | | 2/1992 |
| JP | 11-106022 | * | 11/1999 |

* cited by examiner

*Primary Examiner*—Joseph D. Pape
*Assistant Examiner*—Scott Carpenter
(74) *Attorney, Agent, or Firm*—Arent Fox Kintner Plotkin & Kahn, PLLC

(57) ABSTRACT

A hanging-down jig is provided for supporting a vehicle body frame for a motorcycle in a hung-down manner on a hanger of an overhead conveyor. A dummy frame is mounted on the vehicle body frame for the motorcycle for supporting the vehicle body frame in a hang-down manner on a support arm of the hanger of the overhead conveyor. The dummy frame includes a center member coupled to the vehicle body frame by a pin, and a pair of left and right side members coupled to the vehicle body frame by a pin. The angle of, the longitudinal positions of and the lateral distance between the side members with respect to the center member can be adjusted as desired. The longitudinal and vertical positions of a support portion provided on the support arm of the hanger and engaged with a hanging-down member of the dummy frame can be adjusted as desired.

5 Claims, 19 Drawing Sheets

HANGING-DOWN JIG AND OVERHEAD CONVEYOR FOR MOTORCYCLE

BACKGROUND OF THE INVENTION

1. Field of the Invention

The present invention relates to a hanging-down jig for supporting a vehicle body frame of a motorcycle in a hung-down or suspended manner on a hanger of an overhead conveyor, and to the over head conveyor.

2. Description of the Prior Art

When a vehicle body frame for a motorcycle is supported in a hang-down manner on a hanger of an overhead conveyor for transportation in an assembly line in a factory, it is difficult to stably support the vehicle body frame on a support arm of the hanger, if there is no suitable engage portion on the vehicle body frame. Also there is a possibility that a portion of the hanger abutting against the support arm will be damaged.

Therefore, a device is known from Japanese Patent Application Laid-open No. 4-64508, which is designed so that a bracket as a hanging-down jig, is fixed to the vehicle body frame by a bolt, and a support arm of a hanger is engaged with the bracket to support the vehicle body frame in a hung-down manner.

However, the above known device suffers from a problem that the bracket as a hanging-down jig has no general-purpose properties and for this reason, specialized brackets are required for each type of the motorcycles, and the manufacturing cost and management cost for the brackets are increased.

SUMMARY OF THE INVENTION

The present invention has been accomplished with the above circumstance in view, and it is an object of the present invention to enhance the general-purpose properties of the hanging-down jig for supporting the vehicle body frame for the motorcycle on the hanger of the overhead conveyor.

To achieve the above object, there is provided a motorcycle hanging-down jig for supporting a vehicle body frame for a motorcycle in a hung-down manner on a hanger of an overhead conveyor, comprising a plurality of mounting portions detachably coupled to the vehicle body frame for the motorcycle, and a hanging-down portion engaged with a support arm of the hanger of the overhead conveyor, the distance between the mounting portions being capable of being adjusted.

With this arrangement, the distance between the plurality of mounting portions provided on the hanging-down jig detachably coupled to the vehicle body frame for the motorcycle, can be adjusted. Therefore, the one type of the hanging-down jig can be used commonly for vehicle body frames for a plurality of types of motorcycles by adjusting the distance between the mounting portions in accordance with the size of the vehicle body frame for each of the motorcycles, leading to enhanced general-purpose properties.

Further, there is provided an overhead conveyor including a hanger for hanging-down and transporting a vehicle body frame for a motorcycle having a hanging-down jig mounted thereon, the overhead conveyor comprising a pair of support arms openably and closably provided on the hanger, and provided, at lower ends of bodies thereof, with support portions capable of being engaged with a hanging-down portion of the hanging-down jig. The positions of the support portions with respect to the bodies of the support arms, are capable of being adjusted.

With this arrangement, the positions of the support portions of the pair of support arms openably and closably provided on the hanger of the overhead conveyor can be adjusted. Therefore, even if the position and attitude of mounting of the hanging-down jig are varied depending on the type of the motorcycle, the positions of the support portions of the support arms with respect to the hanging-down jig can be adjusted by adjusting such position in accordance with the size of the vehicle body frame for each of the motorcycles, whereby the vehicle body frame can be hung down and supported in a stable attitude.

BRIEF DESCRIPTION OF THE DRAWINGS

The mode for carrying out the present invention will now be described by way of an embodiment shown in the accompanying drawings.

FIG. 1 is a side view of an entire motorcycle.

FIG. 2 is a plan view of an assembly line for the motorcycle.

FIG. 3 is a view showing a power unit with a main frame and dummy frames attached thereto.

FIG. 4 is a front view of the front dummy frame.

FIG. 5 is a view taken in the direction of an arrow 5 in FIG. 4.

FIG. 6 is a side view of the rear dummy frame.

FIG. 7 is a view taken in the direction of an arrow 7 in FIG. 6.

FIG. 8 is an enlarged sectional view taken along a line 8—8 in FIG. 6.

FIG. 9 is an enlarged sectional view taken along a line 9—9 in FIG. 6.

FIG. 10 is a side view of a first transferring station.

FIG. 11 is a view taken in the direction of an arrow 11 in FIG. 10.

FIG. 12 is a view taken in the direction of an arrow 12 in FIG. 10.

FIG. 13 is an enlarged view of an essential portion in FIG. 10.

FIG. 14 is a view similar to FIG. 13, except that a hanger of a second conveyor has been removed from FIG. 13.

FIG. 15 is an enlarged view taken in the direction of an arrow 15 in FIG. 13.

FIG. 16 is an enlarged view of an essential portion in FIG. 10.

FIG. 17 is a view taken in the direction of an arrow 17 in FIG. 16.

FIGS. 18 and 19 are views similar to FIG. 10 but for explaining the operation of the embodiment according to the present invention.

DETAILED DESCRIPTION OF THE PREFERRED EMBODIMENT

Figure 1:
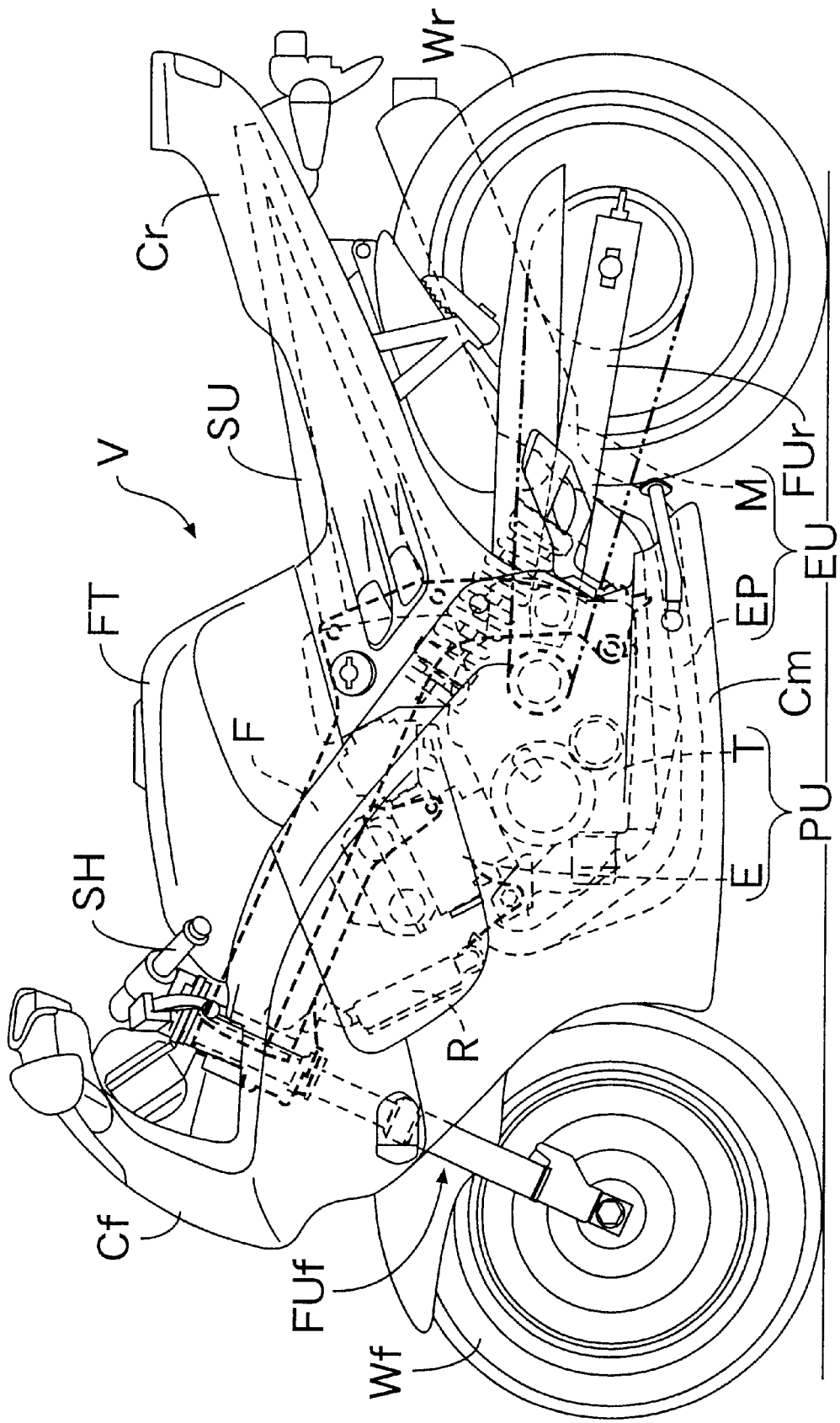
FIGS. 1 to 19 show an embodiment of the present invention.

FIG. 1 shows a motorcycle V assembled in an assembly line of the present invention. The motorcycle V comprises a power unit PU including an engine E and a transmission T formed integrally with each other, a front fork unit FUf provided integrally with a front wheel Wf, a rear fork unit FUr integrally provided with a rear wheel Wr, a main frame F, a radiator R, an exhaust unit EU including an exhaust pipe EP and a muffler M formed integrally with each other, a seat rail unit SU, a fuel tank FT, a steering handlebar SH, a front cowl Cf, a main cowl Cm, a rear cowl Cr and the like.

Figure 2:
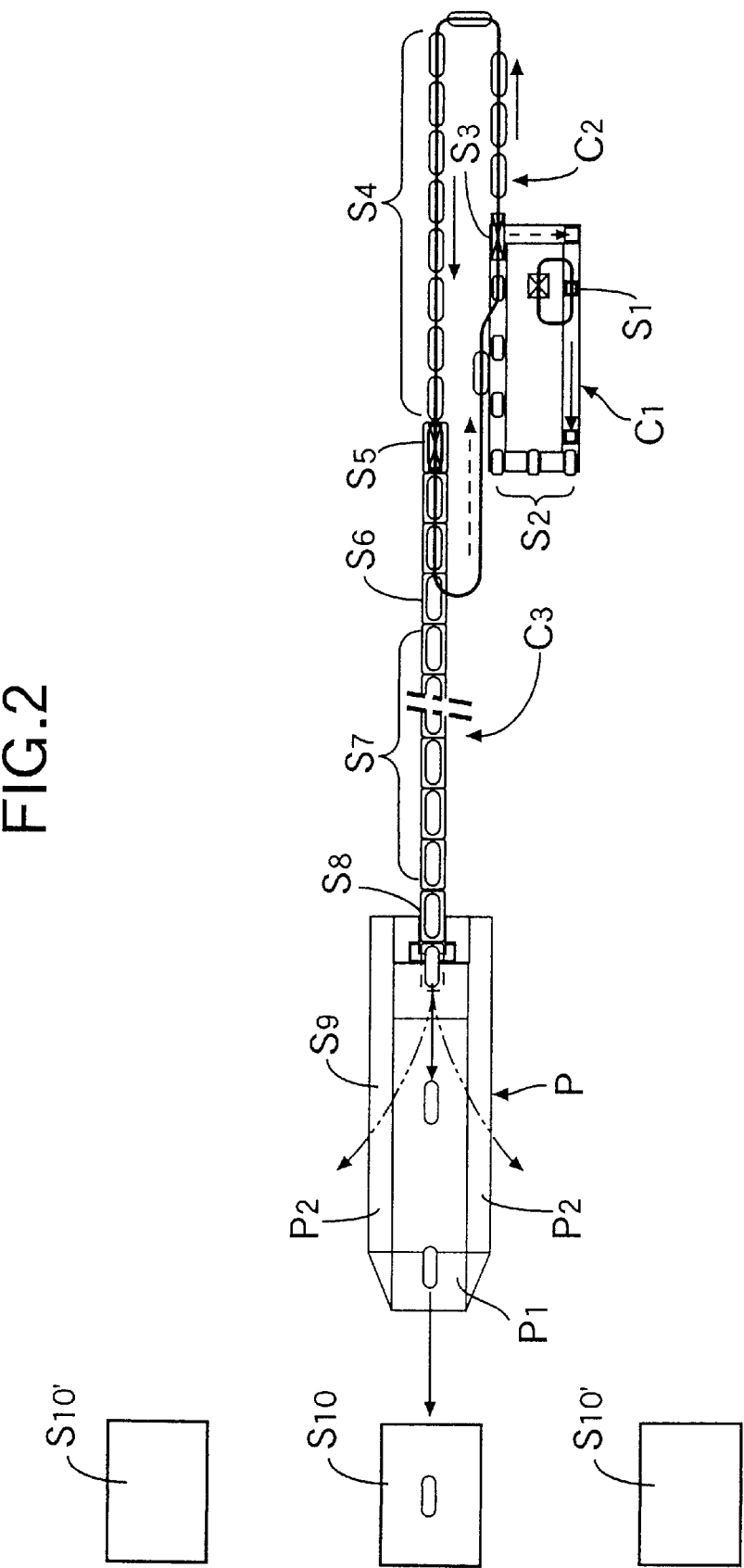

As shown in FIG. 2, the motorcycle assembly line comprises a first conveyor $C_1$ in which a pallet is circulated along a rectangular path, a second conveyor $C_2$ in which a hanger is circulated along an elliptic path, and a third conveyor $C_3$ in which a pallet is moved along a rectilinear path. The third conveyor $C_3$ has an advancing passage extending along an upper surface of a floor and a returning passage accommodated in a lower surface of the floor. The advancing and returning passages are vertically superposed one on another, and the pallet is circulated through the rectangular path in a vertical plane.

Figure 3:
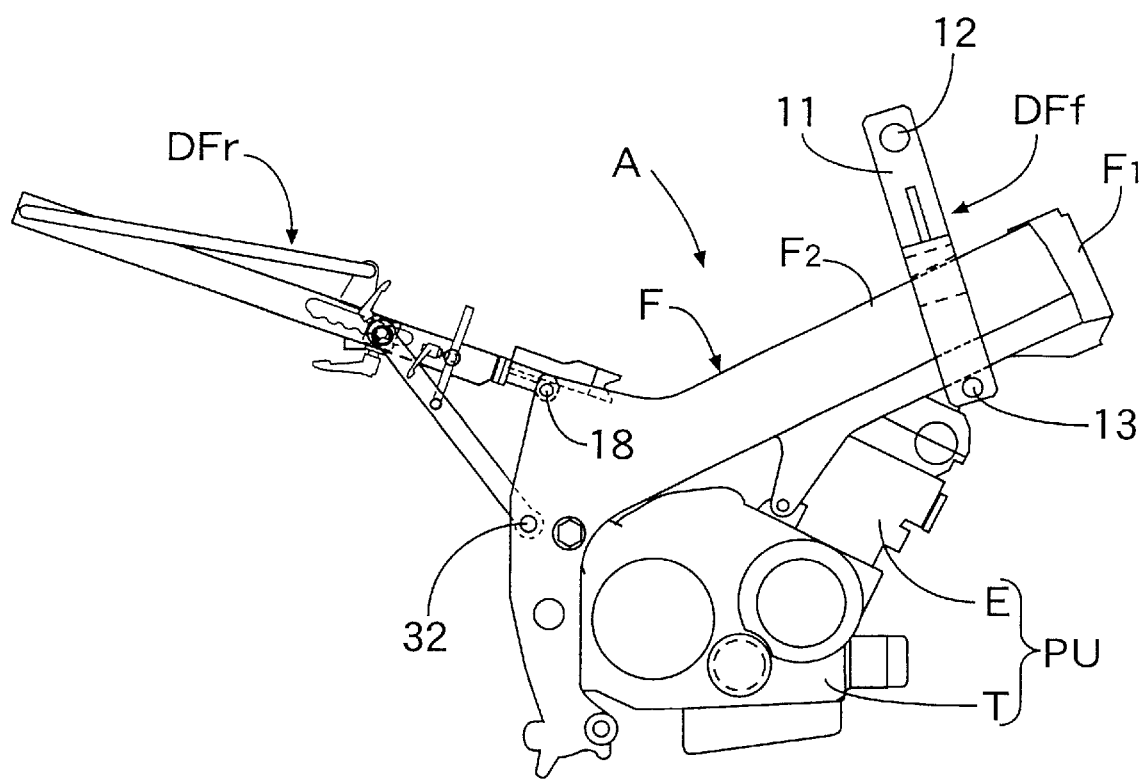

The power unit PU which is assembled in a sub-line (not shown), is transported along the lower surface of the floor to a power unit supply station $S_1$ on the first conveyor $C_1$, where it is supplied onto the pallet in the first conveyor $C_1$. The pallet having the power unit PU loaded thereon is moved in a clockwise direction on the first conveyor $C_1$, and the main frame F, the front dummy frame DFf and the rear dummy frame DFr are assembled in a plurality of assembling stations $S_2$ provided in the path of movement of the pallet. The front dummy frame DFf and the rear dummy frame DFr are shown in FIG. 3.

In a first transferring station $S_3$ in which the first conveyor $C_1$ comprising a floor conveyor and the second conveyor $C_2$ comprising an overhead conveyor are vertically superposed one on another, a subassembly comprising the main frame F, the front dummy frame DFf and the rear dummy frame DFr assembled to the power unit PU is transferred from the pallet of the first conveyor $C_1$ to the hanger of the second conveyor $C_2$. The pallet depleted as a result of the delivery of the subassembly to the hanger of the second conveyor $C_2$ is moved in the clockwise direction on the first conveyor $C_1$ back to the power unit supply station $S_1$.

The hanger of the second conveyor $C_2$ supports the subassembly in a hanging-down manner through the front dummy frame DFf and the rear dummy frame DFr which are mounted on the power unit PU, and is moved in a counter-clockwise direction along the elliptic path. A plurality of assembling stations $S_4$ are provided in the path of movement of the hanger. In the assembling stations $S_4$, the radiator R, the front fork unit FUf, the rear fork unit FUr, the exhaust unit EU and the like are assembled to the subassembly to form a vehicle body of the motorcycle V.

In a second transferring station $S_5$ in which the second conveyor $C_2$ comprising the overhead conveyor and the third conveyor $C_3$ comprising a floor conveyor are vertically superposed one on another, the vehicle body having the front wheel Wf and the rear wheel Wr already mounted thereon is transferred from the hanger of the second conveyor $C_2$ onto the pallet of the third conveyor $C_3$. The hanger depleted as a result of the delivery of the vehicle body to the pallet of the third conveyor $C_3$, is moved in the counterclockwise direction on the second conveyor $C_2$ back to the first transferring station $S_3$.

While the pallet of the third conveyor $C_3$ is being moved along the rectilinear advancing passage supporting the vehicle body, the front dummy frame DFf and the rear dummy frame DFr becoming useless are first removed in a dummy frame separating station $S_6$ and then, the seat rail unit SU, the fuel tank FT, the steering handlebar SH, the front cowl Cf, the main cowl Cm, the rear cowl Cr and the like are assembled in a plurality of assembling stations $S_7$ to finish the motorcycle V.

The finished motorcycle V is subjected to a finish check for the appearance and the like in a first finish check station $S_8$ provided at a terminal end of the third conveyor $C_3$, and is then discharged from an unloading station $S_9$ connected to the terminal end of the conveyor $C_3$ to a second finish check station $S_{10}$, where a finish check for the engine, brake, head light and the like is carried out.

The unloading station $S_9$ includes a platform P which is higher in level than the surrounding floor surface. The motorcycle V with an operator getting thereon at a start end of the platform P is allowed to travel down a slope $P_1$ of the platform P to the second finish check station $S_{10}$ by the force of gravity. The pallet depleted as a result of the discharge of the motorcycle V is returned to the second transferring station $S_5$ through the returning passage of the third conveyor $C_3$ disposed on the lower surface of the floor.

The platform P of the unloading station $S_9$ is provided with left and right slopes $P_2$, $P_2$ in addition to a front slope $P_1$. When an abnormality has been found in the first finish check station $S_8$, the motorcycle V can be discharged sideways through the left and right slopes $P_2$, $P_2$, or can be moved left and right reserve finish check stations $S_{10}'$, $S_{10}'$.

Shown in FIG. 3 is the subassembly A comprised of the main frame F, the front dummy frame DFf and the rear dummy frame DFr which have been assembled to the power unit PU in the assembling stations $S_2$ of the first conveyor $C_1$. The structures of the front dummy frame DFf and the rear dummy frame DFr will be described below with reference to FIGS. 3 to 7.

The front dummy frame DFf comprises a pair of left and right side members 11, 11 connected at their upper ends to each other by a laterally extending hanging-down rod 12. Locked portions $12_1$, $12_1$ are formed at tip ends of the hanging-down rod 12 which protrudes outwards from the side members 11, 11. The main frame F of the motorcycle V includes left and right frame halves $F_2$, $F_2$ diverging laterally from the head pipe $F_1$ and extending rearwards of the vehicle body. Receiving seats $11_1$, $11_1$ are formed on the left and right side members 11, 11 of the front dummy frame DFf and are capable of being fitted into left and right frame halves $F_2$, $F_2$ of the main frame F from above. The left and right side members 11, 11 of the front dummy frame DFf are provided at their lower ends with pin holes $11_2$, $11_2$ through which a pin 13 having a knob $13_1$ at one end can be inserted.

Thus, the front dummy frame DFf is mounted to the main frame F by moving the front dummy frame DFf toward the main frame F from above to fit the receiving seats $11_1$, $11_1$ of the left and right side members 11, 11 into the left and right frame halves $F_2$, $F_2$ of the main frame F, and inserting the pin 13 through the pin holes $11_2$, $11_2$ in the left and right side members 11, 11.

The rear dummy frame DFr includes a center member 14 comprising a longitudinally extending rectangular tube, and a loop-shaped hanging-down member 16 is fixed at its front and rear ends to brackets 15, 15 mounted on a central upper surface of the center member 14 and to a rear end of the center member 14, respectively. A bifurcated bracket 17 is fixed to a front end of the center member 14. Pin holes $17_1$, $17_1$; $F_3$, $F_3$ are defined in a front end of the bracket 17 and rear portions of the left and right frame halves $F_2$, $F_2$ of the main frame F, respectively, so that a pair of pins 18,18 having knobs $18_1$, $18_1$ can be inserted through the pin holes $17_1$, $17_1$; $F_3$, $F_3$, respectively. A pair of left and right brackets 20, 20 are fixed to the bracket 17 through a connecting plate 19, and V-shaped engage members $20_1$, $20_1$ formed of a synthetic resin are mounted at front ends of the brackets 20, 20.

Longitudinally extending elongated bores 21, 21 are defined in the left and right sides of a central portion of the center member 14 and have a plurality of recesses $21_1$ in lower edges thereof. A slide block 22 is slidably fitted in the center member 14, and a rear cross rod 23 laterally passes through the slide block 22 and extends to the outside of the center member 14 through the elongated bores 21, 21. The rear cross rod 23 is positioned laterally with respect to the center member 14 by washers 33, 33 abutting against the opposite sides of the center member 14 and by clips 34, 34 engaging with the rear cross rod 23 outside the washers 33, 33. A bolt 24 embedded in a lower end of the slide block 22 passes through a slit $14_1$ defined in a lower surface of the center member 14 to protrude downwards, and a locking lever 25 is threadedly engaged with the bolts 24.

Therefore, when the locking lever 25 is tightened, the slide block 22 is moved downwards within the center member 14, and the rear cross rod 23 is fitted into and positioned longitudinally in one of the recesses $21_1$, $21_1$ of the elongated bores 21, 21. When the locking lever 25 is loosened, the slide block 22 is moved upwards within the center member 14, and the rear cross rod 23 is moved out of one of the recesses $21_1$, $21_1$ of the elongated bores 21, 21. Therefore, the longitudinal positions of the slide block 22 and the rear cross rod 23 can be regulated as desired within each of the elongated bores 21, 21.

Upper ends of a pair of side members 26, 26 are laterally, slidably fitted in the left and right ends of the rear cross rod 23. Each of the side members 26, 26 can be fixed in any position on the rear cross rod 23 by locking levers 27, 27. Left and right ends of the front cross rod 28 are slidably fitted in intermediate portions of the pair of side members 26, 26. A stay 29 rising from an intermediate portion of the front cross rod 28, is slidably fitted in a guide member 30 mounted on one side of the center member 14 and is locked by a locking lever 31. Pin holes $26_1$, $26_1$; $F_4$, $F_4$, through which a pin 32 having a knob $32_1$ can be inserted, are defined in the front ends of the left and right side members 26, 26 and the rear ends of the left and right frame halves $F_2$, $F_2$ of the main frame F, respectively.

The shape of the rear dummy frame DFr having the above-described structure can be adjusted as desired depending on the type of the motorcycle V on which the rear dummy frame DFr is mounted. Specifically, the longitudinal positions of the pair of left and right side members 26, 26 with respect to the center member 14 can be adjusted by loosening the locking lever 25 to slide the slide block 22 forwards and backwards within the center member 14. In addition, the distance between both the side members 26, 26 can be adjusted by loosening the locking levers 27, 27 to slide the left and right side members 26, 26 relative to the rear cross rod 23 and the front cross rod 28. Further, the angle formed by the side members 26, 26 with respect to the center member 14 can be adjusted by loosening the locking lever 31 to slide the stay 29 relative to the guide member 30.

As a result, the lateral distance $D_1$ (see FIG. 7) between the pin holes $26_1$, $26_1$ in the left and right side members 26, 26 can be adjusted, and the vertical distance $D_2$ (see FIG. 6) between the pin holes $17_1$, $17_1$ in the bracket 17 and the pin holes $26_1$, $26_1$ in the side members 26, 26 can be adjusted. Therefore, the same rear dummy frame DFr can be applied to a plurality of types of motorcycles V, leading to enhanced general-purpose properties. Moreover, no bolt is used for mounting of the front dummy frame DFf and the rear dummy frame DFr, and the insertion and withdrawal of the pins 13; 18, 18; and 32 suffice for the mounting of the frames DFf and DFr, and hence, the mounting and removing operation is extremely easy.

To mount the adjusted rear dummy frame DFr on the main frame F, the pair of pins 18, 18 are inserted through the pair of pin holes $17_1$, $17_1$ in the bracket 17 at the tip end of the center member 14 and the pin holes $F_3$, $F_3$ in the main frame F and further, the pin 32 are inserted through the pin holes $26_1$, $26_1$ in the tip ends of the side members 26, 26 and the pin holes $F_4$, $F_4$ in the main frame F.

Figure 6:
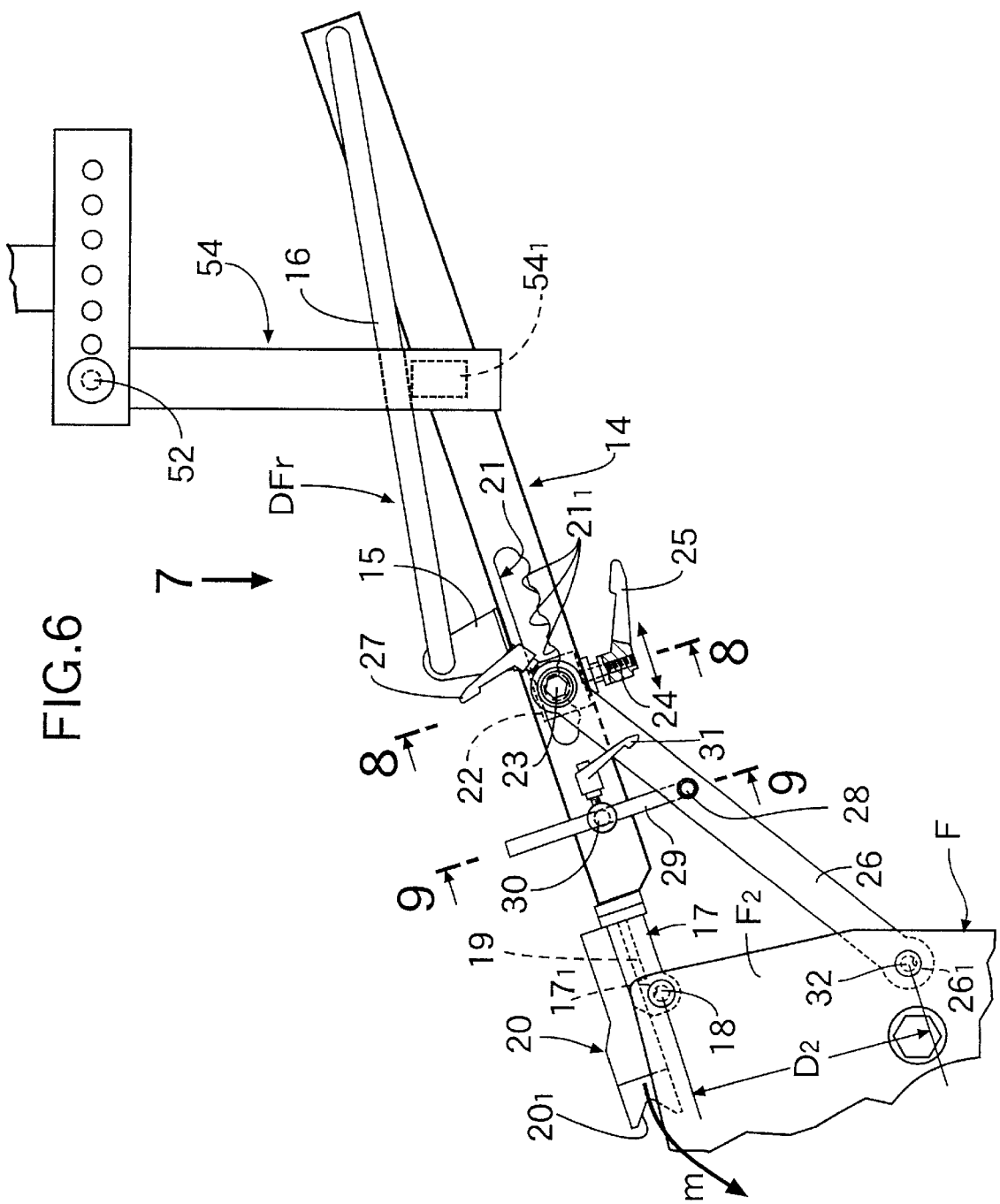
Figure 7:
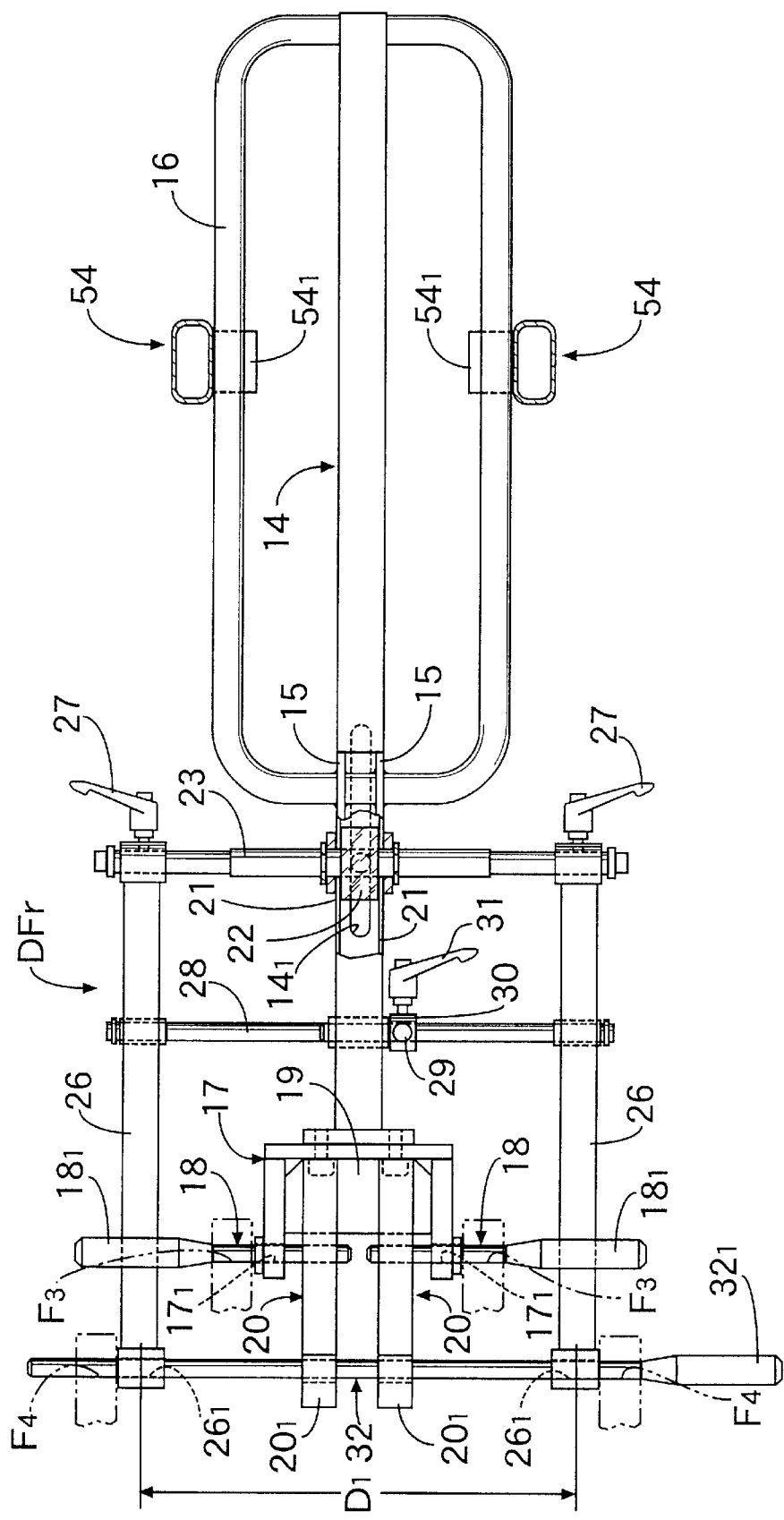
Figure 8:
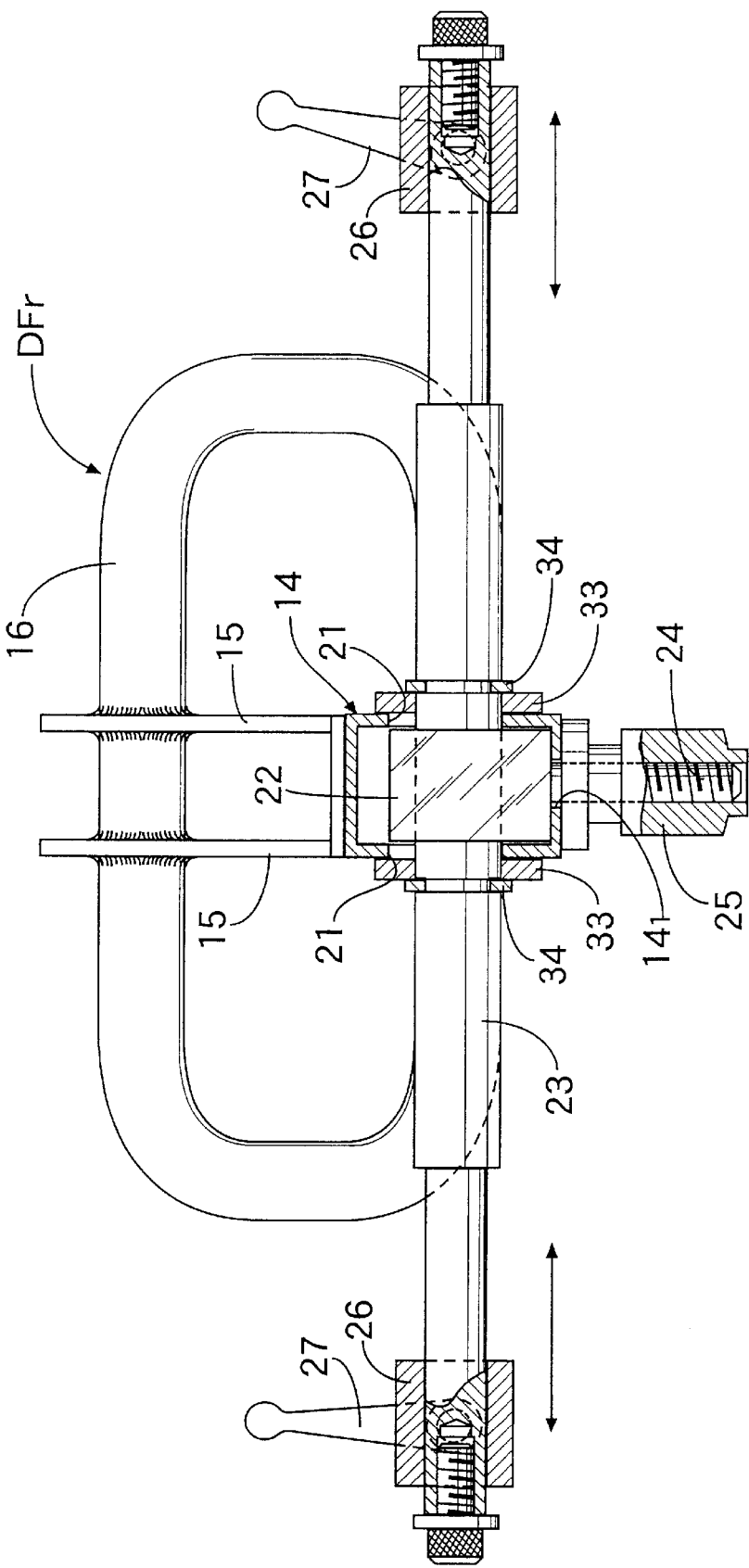
Figure 9:
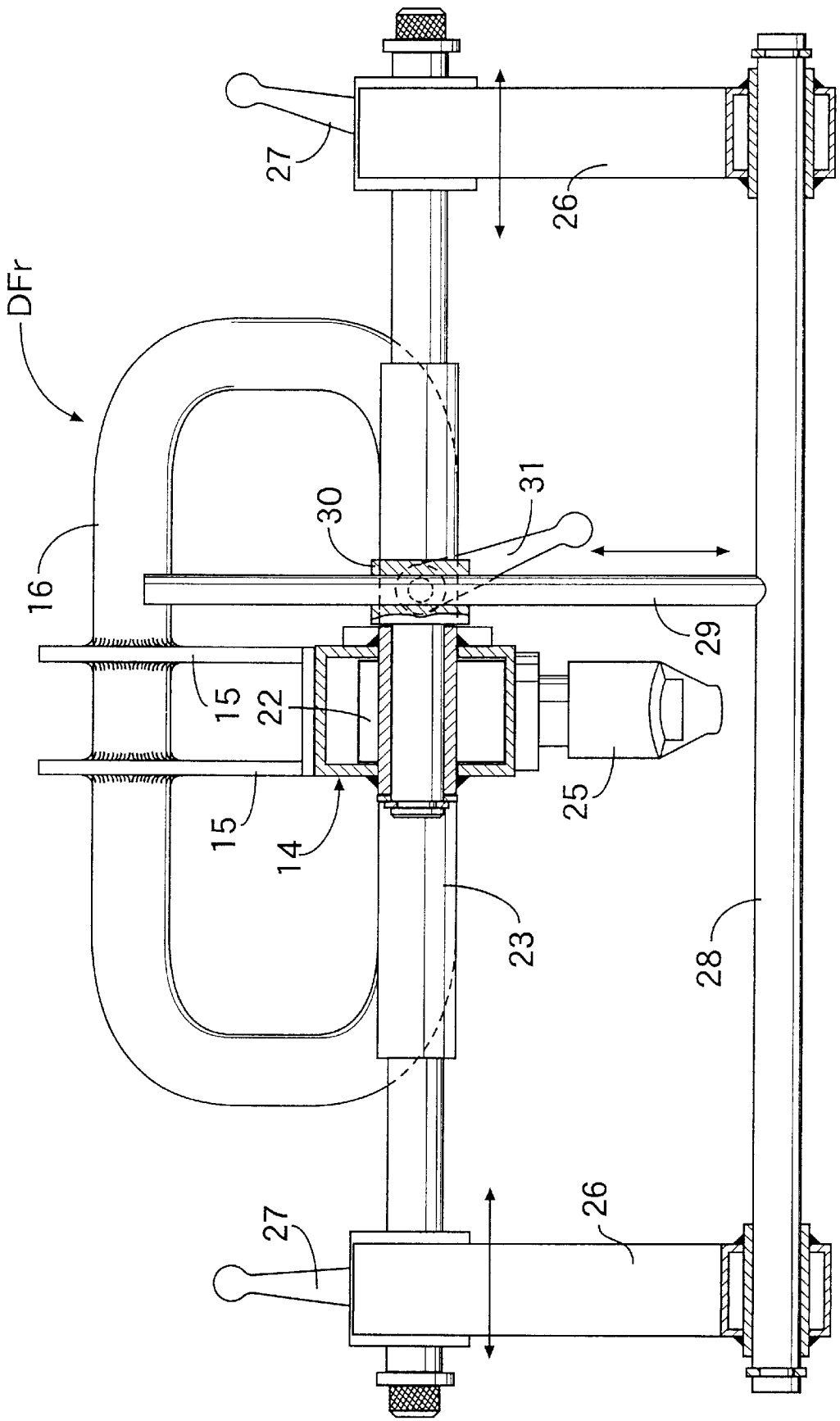

Depending on the shape of the main frame F, the engage members $20_1$, $20_1$ of the brackets 20, 20 may be brought into engagement with engaged portions of the main frame F, in place of the bracket 17 of the center member 14 being fixed to the main frame F by the pins 18, 18. When the subassembly A has been supported in a hung-down manner, a moment in the direction of an arrow m in FIG. 6 is applied to the rear dummy frame DFr about the pin 32 due to the weight of the subassembly and hence, the engage members $20_1$, $20_1$ of the brackets 20, 20 are biased, so that it is urged against the main frame F, and there is no possibility that the engagement of the engage members $20_1$, $20_1$ with the main frame F could be released.

The structure of the first transferring station $S_3$ will be described below with reference to FIGS. 10 to 17.

Figure 13:
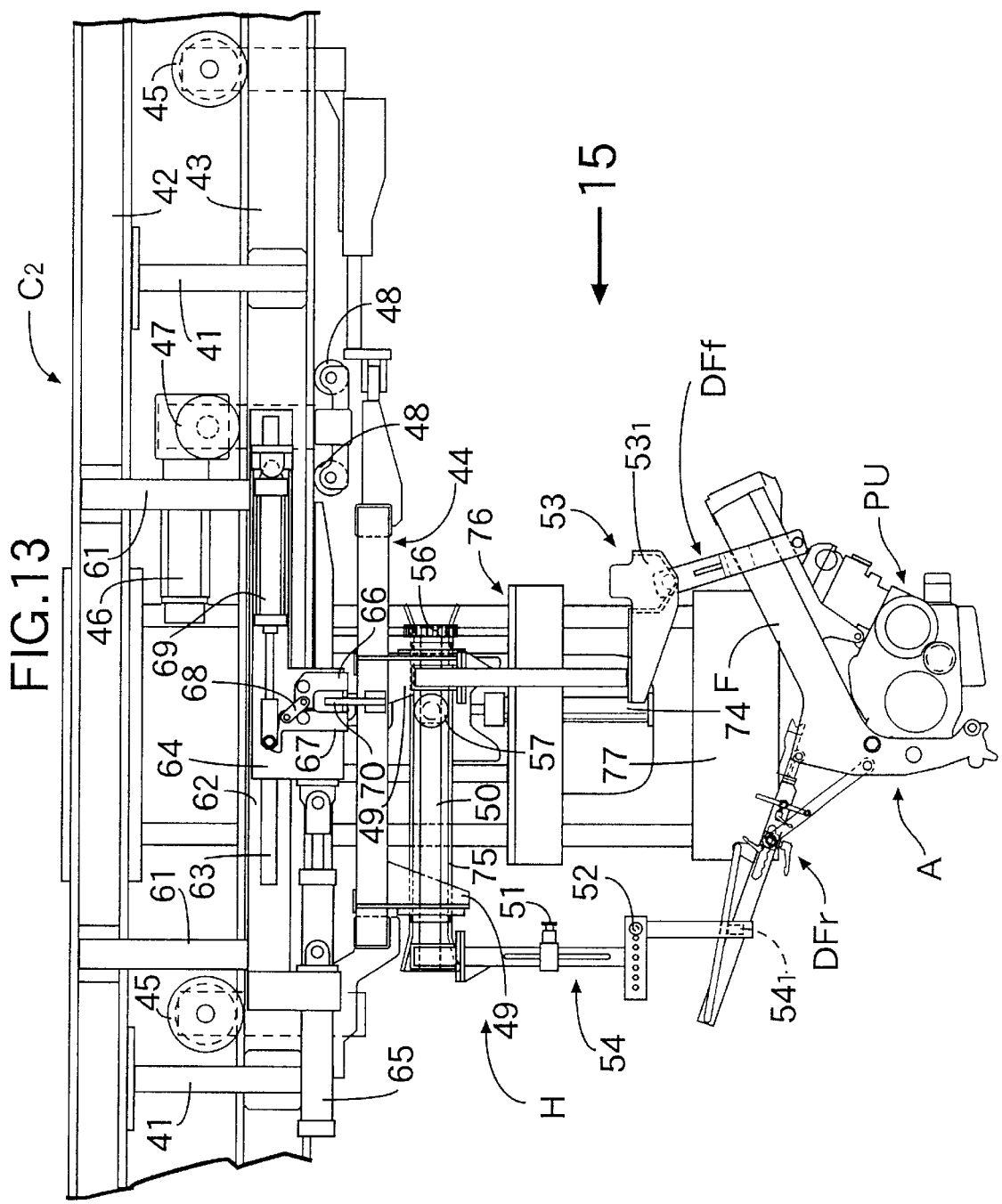
Figure 14:
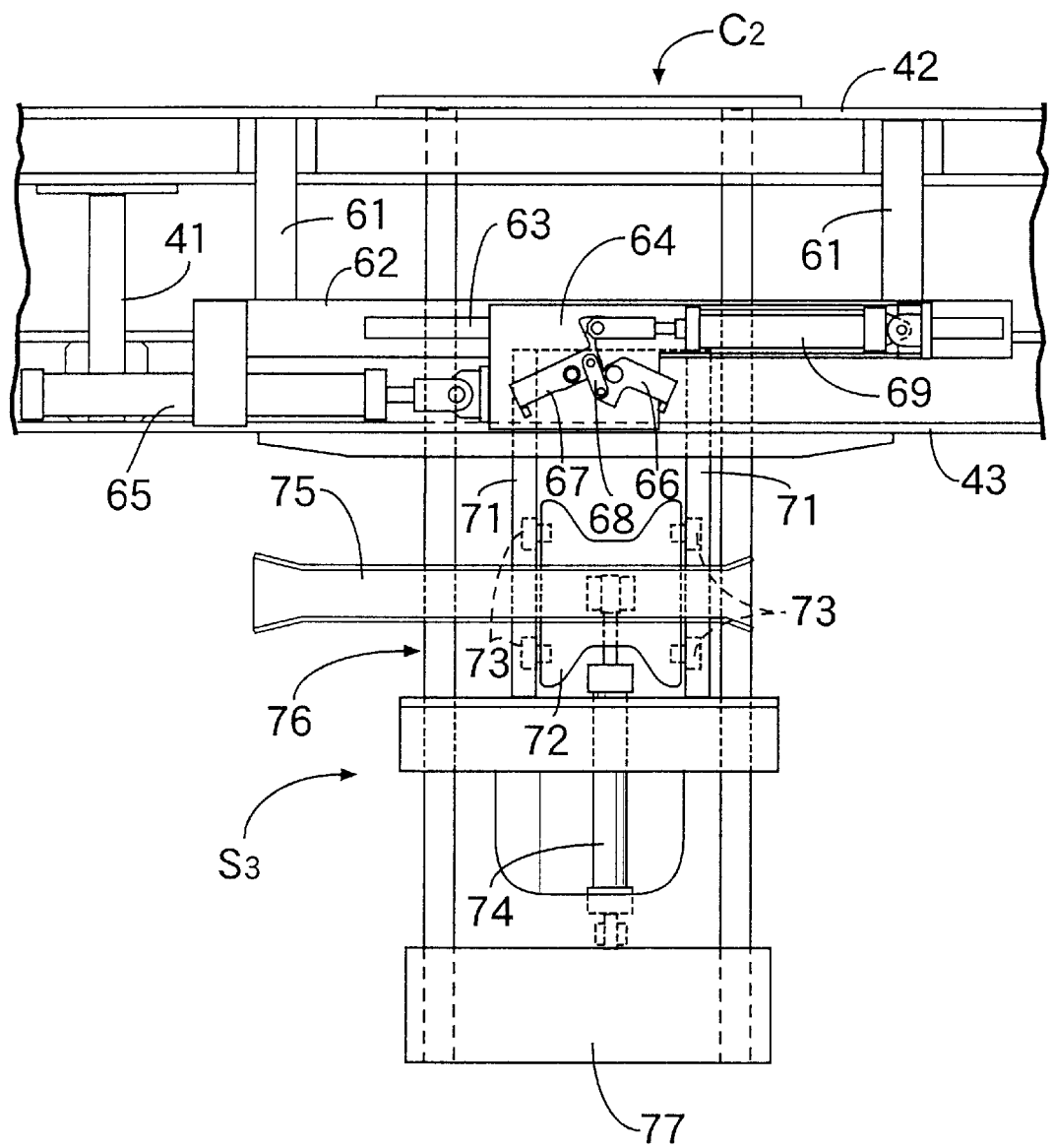
Figure 15:
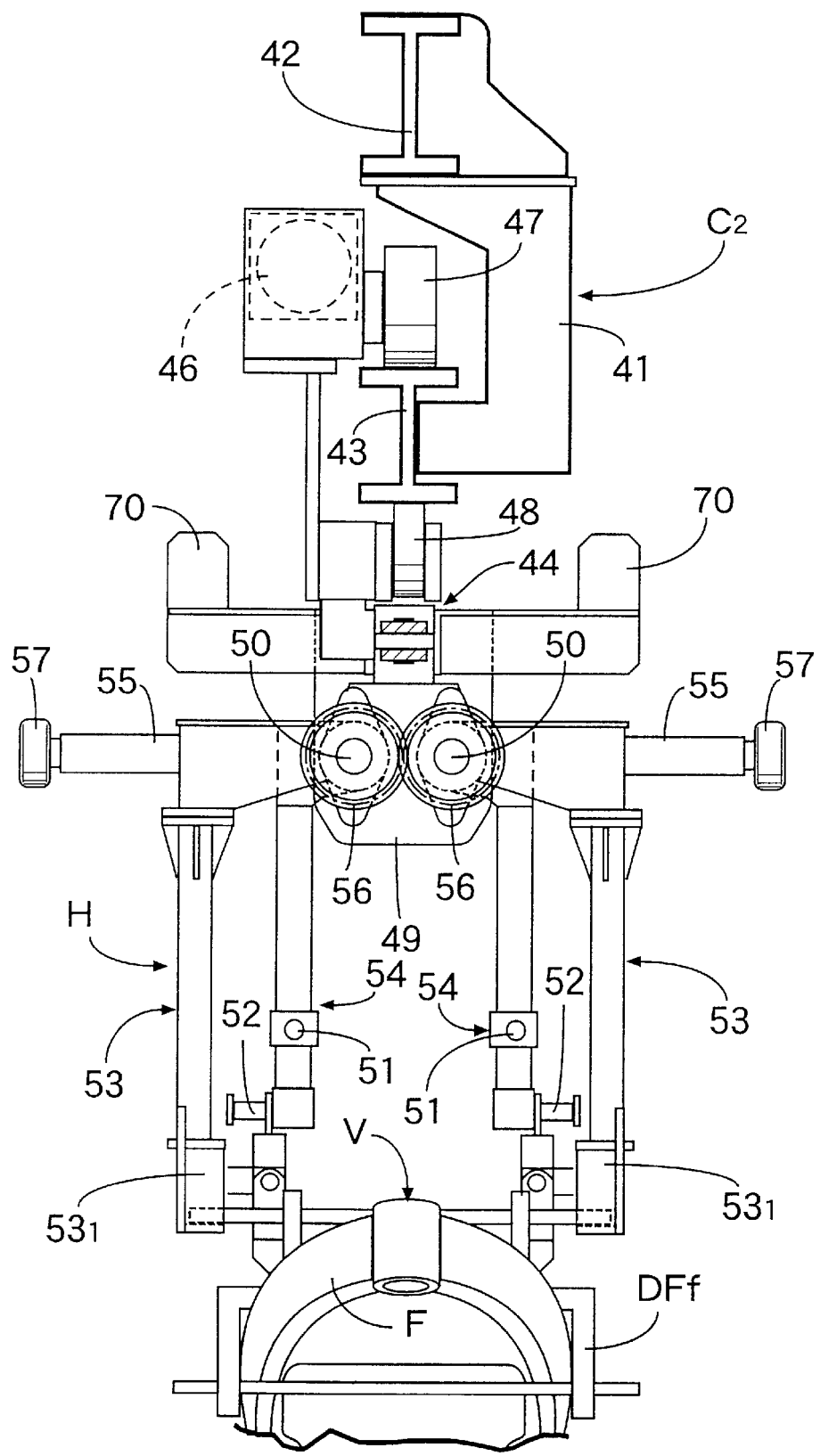

As shown in FIGS. 13 to 15, the self-propelled hanger H of the second conveyor $C_2$ is supported by an upper support rail 42 and a lower support rail 43 connected to each other by stays 41 disposed at predetermined distances. The hanger H includes a carriage 44 extending longitudinally along a lower surface of the lower support rail 43, and casters 45, 45 mounted at front and rear portions of the carriage 44 are rolled on an upper surface of the lower support rail 43. A single driven wheel 47 and two guide wheels 48, 48 are mounted at locations closer to the front from the center of the carriage 44. The driven wheel 47 is mounted to abut against the upper surface of the lower support rail 43 and rotated by a motor 46, and the guide wheels 48, 48 are mounted to abut against the lower surface of the lower support rail 43. Therefore, the hanger H can be self-propelled along the lower support rail 43 by driving the driven wheel 47 by the motor 46.

A pair of left and right longitudinally extending pivots 50, 50 are rotatably supported on a pair of front and rear brackets 49, 49 fixed to a lower surface of the carriage 44. Front support arms 53, 53 and rear support arms 54, 54 depend from front and rear ends of the pivots 50, 50, respectively, and roller support shafts 55, 55 protrude leftwards and rightwards from locations adjacent the front support arms 53, 53, respectively, and include guide rollers 57, 57 at tip ends thereof, respectively. The pair of left and right pivots 50, 50 are provided at their front ends with interlocking gears 56, 56 meshed with each other and hence, the pivots 50, 50 are rotated through the same angle in opposite directions in operative association with each other.

Figure 4:
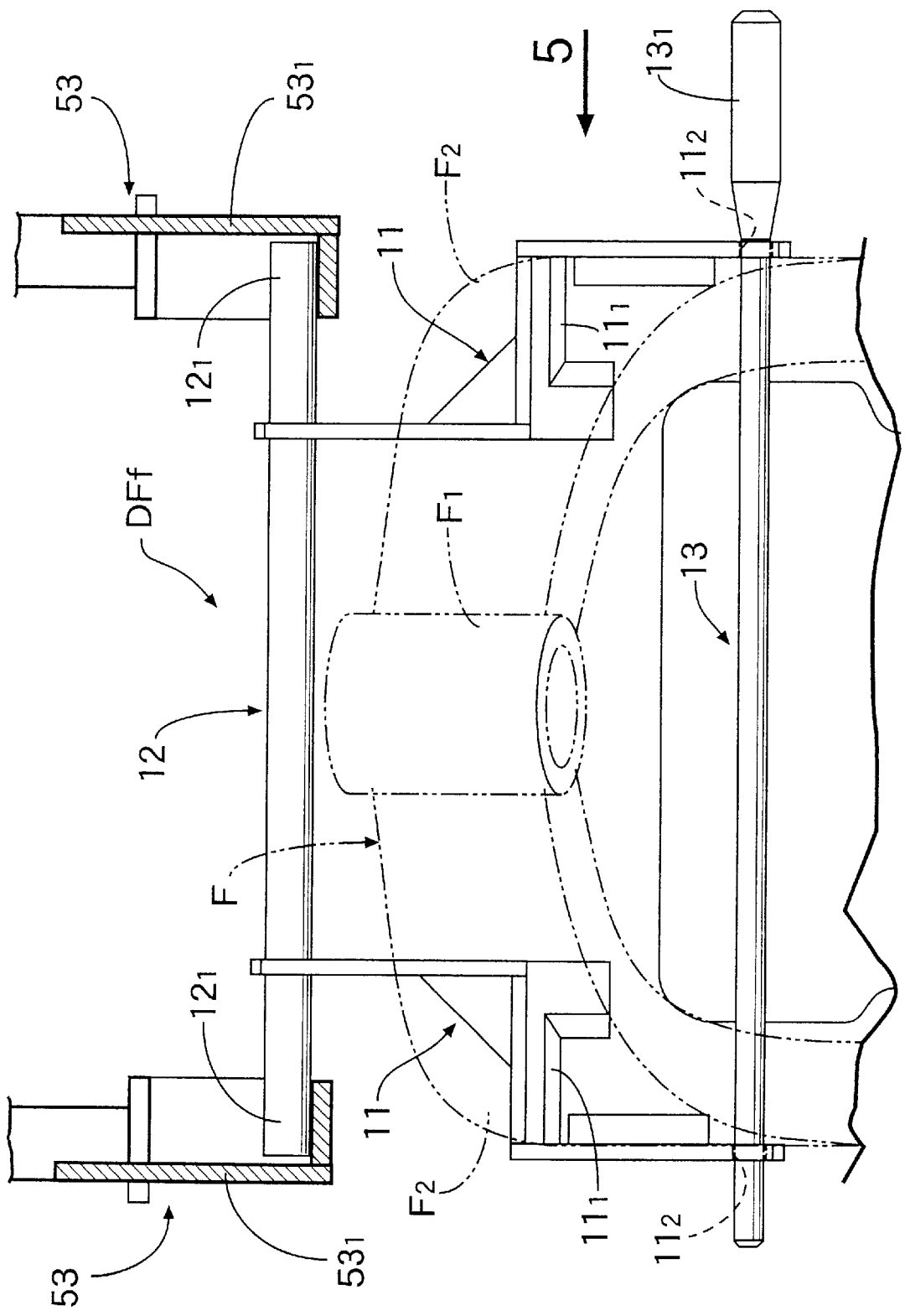
Figure 5:
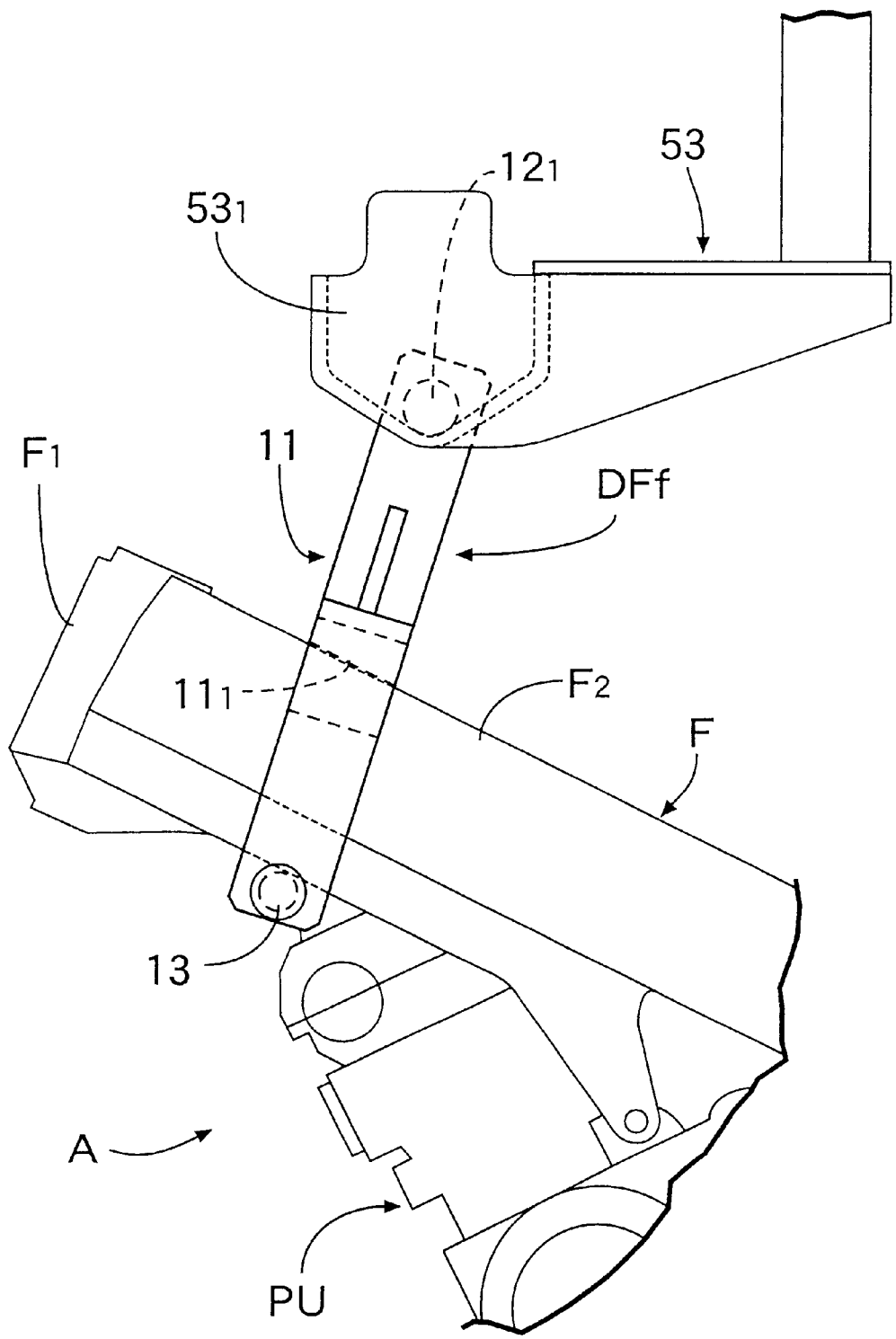

The front support arms 53, 53 are provided at their lower end with support portions $53_1$, $53_1$ which are capable of being engaged with the locked portions $12_1$, $12_1$ of the hanging-down rod 12 of the front dummy frame DFf assembled in the assembling station $S_2$ of the first conveyor $C_1$ (see FIGS. 4 and 5). The rear support arms 54, 54 are provided at their lower end with support portions $54_1$, $54_1$ which are capable of being engaged with the hanging-down member 16 of the rear dummy frame DFr assembled in the assembling station $S_2$ of the first conveyor $C_1$ (see FIGS. 6 and 7). The positions of the support portions $54_1$, $54_1$ of the rear support arms 54, 54 can be adjusted vertically by insertion and withdrawal of the pins 51, 51, and longitudinally by the insertion and withdrawal of the pins 52, 52, so that it is possible to accommodate to the different types of the motorcycles V (see FIG. 13).

As described above, the vertical positions and the longitudinal positions of the support portions $54_1$, $54_1$ of the rear support arms 54, 54 can be adjusted with respect to bodies of the rear support arms 54, 54. Therefore, even if the position and attitude of mounting of the rear dummy frame DFr are varied depending on the type of the motorcycle V, the subassembly A can be supported in a hung-down manner in an optimal attitude on the hanger H.

A guide member 62 is supported on one side of the upper support rail 42 through a pair of front and rear brackets 61, 61, and a slide plate 64 is longitudinally slidably carried on a guide rail 63 fixed to a side of the guide member 62. A positioning cylinder 65 is mounted at a rear end of the guide member 62 and connected to the slide plate 64. Therefore, the longitudinal position of the slide plate 64 with respect to the guide member 62 can be adjusted by expanding and contracting the positioning cylinder 65.

A pair of front and rear clamp arms 66 and 67 are pivotally supported on a side of the slide plate 64 and connected to each other by a link 68. Therefore, the clamp arms 66 and 67 are opened and closed in operative association with each other by driving one of the clamp arms 67 with a clamping cylinder 69 mounted at a front end of the slide plate 64, thereby clamping one of engaged projections 70, 70 protruding leftwards and rightwards from the carriage 44 of the hanger H.

Arcuate guide grooves $71_1$, $71_1$ are defined in a pair of side plates 71, 71 fixed to the upper support rail 42 through a support frame 76, and a swingable frame 72 is supported in the guide grooves $71_1$, $71_1$ through guide rollers 73. The swingable frame 72 is connected to a swinging cylinder 74 supported on a bracket 77 mounted at a lower portion of the support frame 76 to swing along the guide grooves $71_1$, $71_1$. A longitudinally extending guide rail 75 is mounted on an inner surface of the swingable frame 72, and one of the guide rollers 57, 57 mounted at the tip ends of the roller support shafts 55, 55 protruding leftwards and rightwards from the carriage 44 of the hanger H, can be brought into engagement with the guide rail 75.

Figure 10:
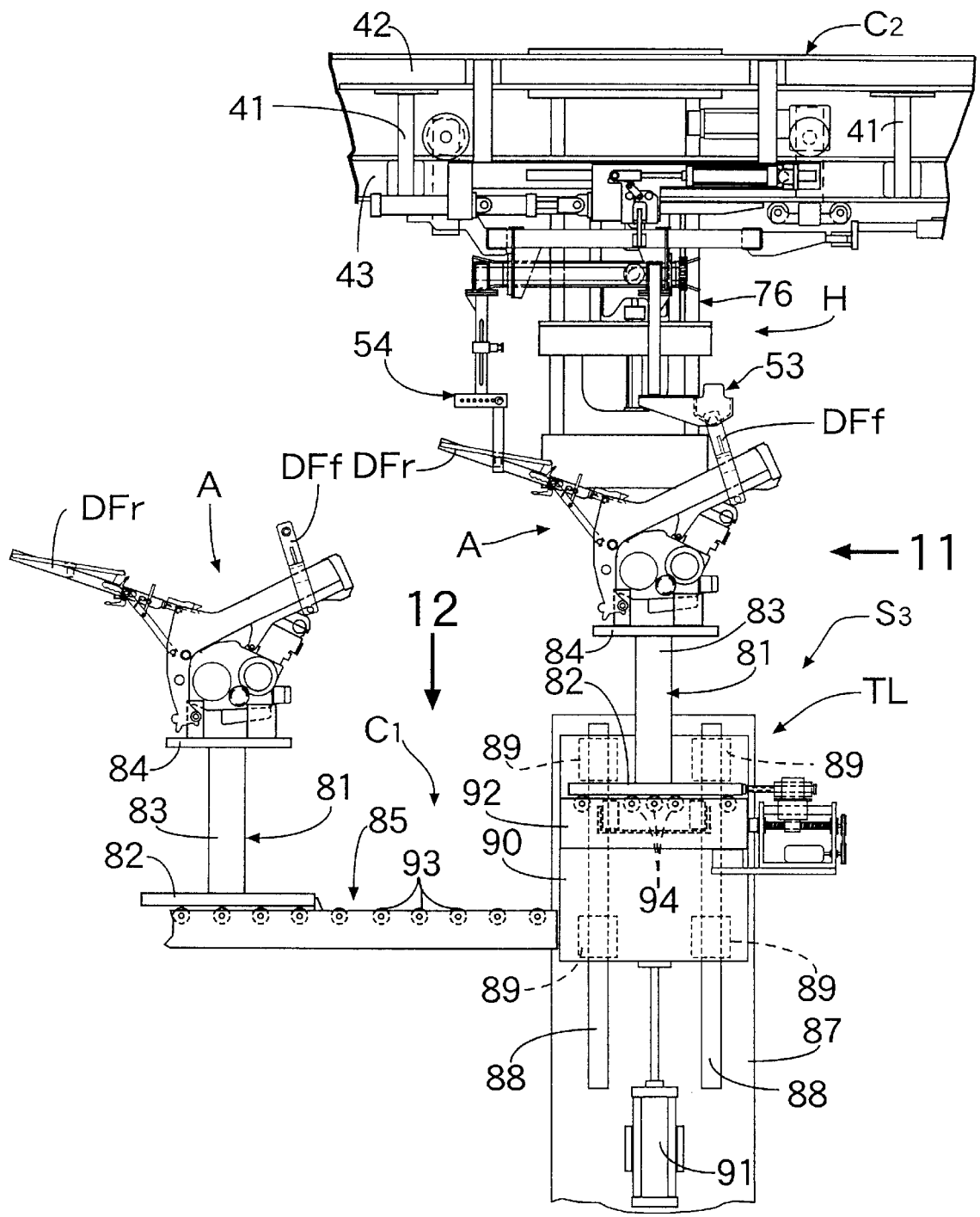
Figure 11:
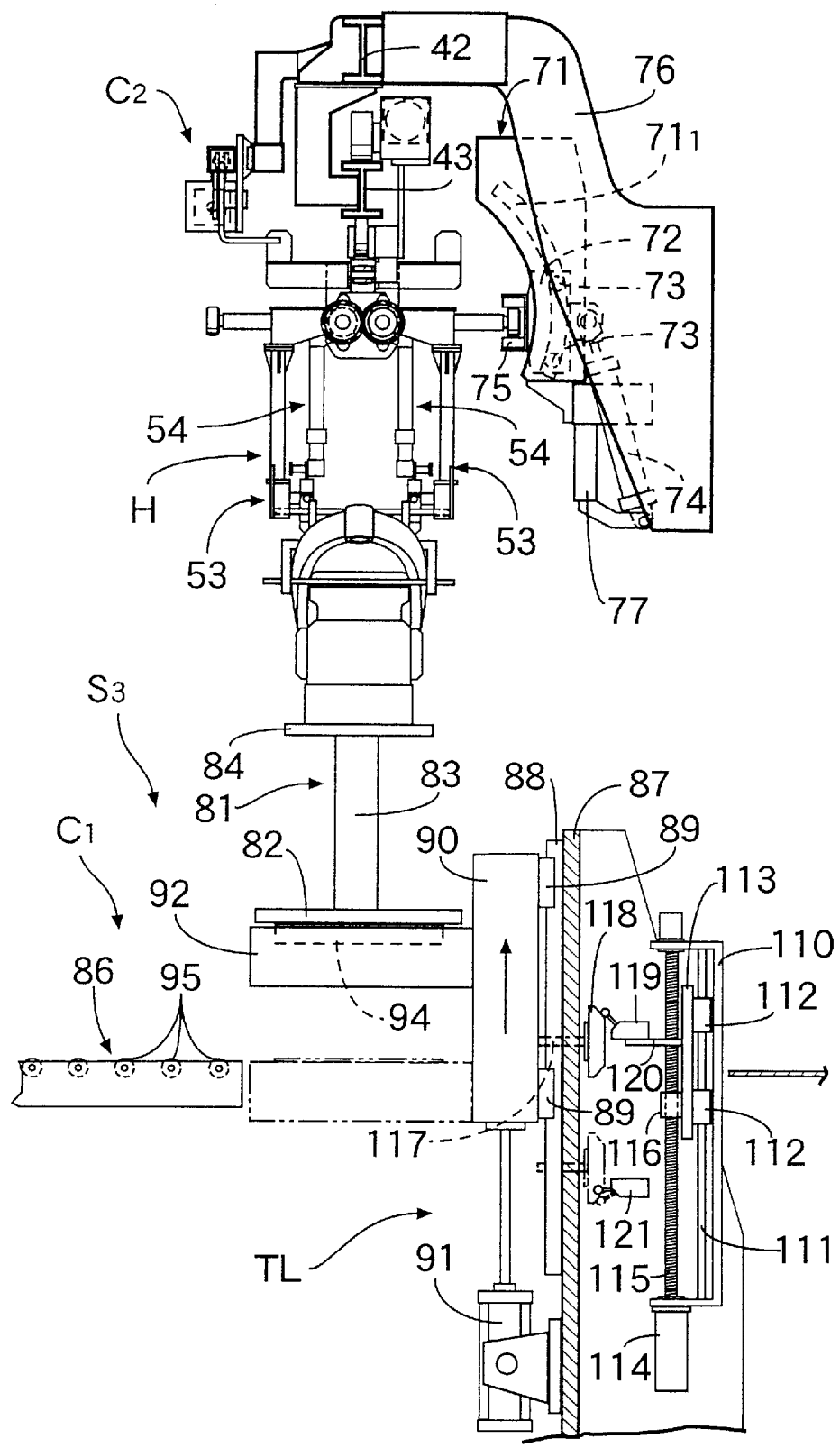
Figure 12:
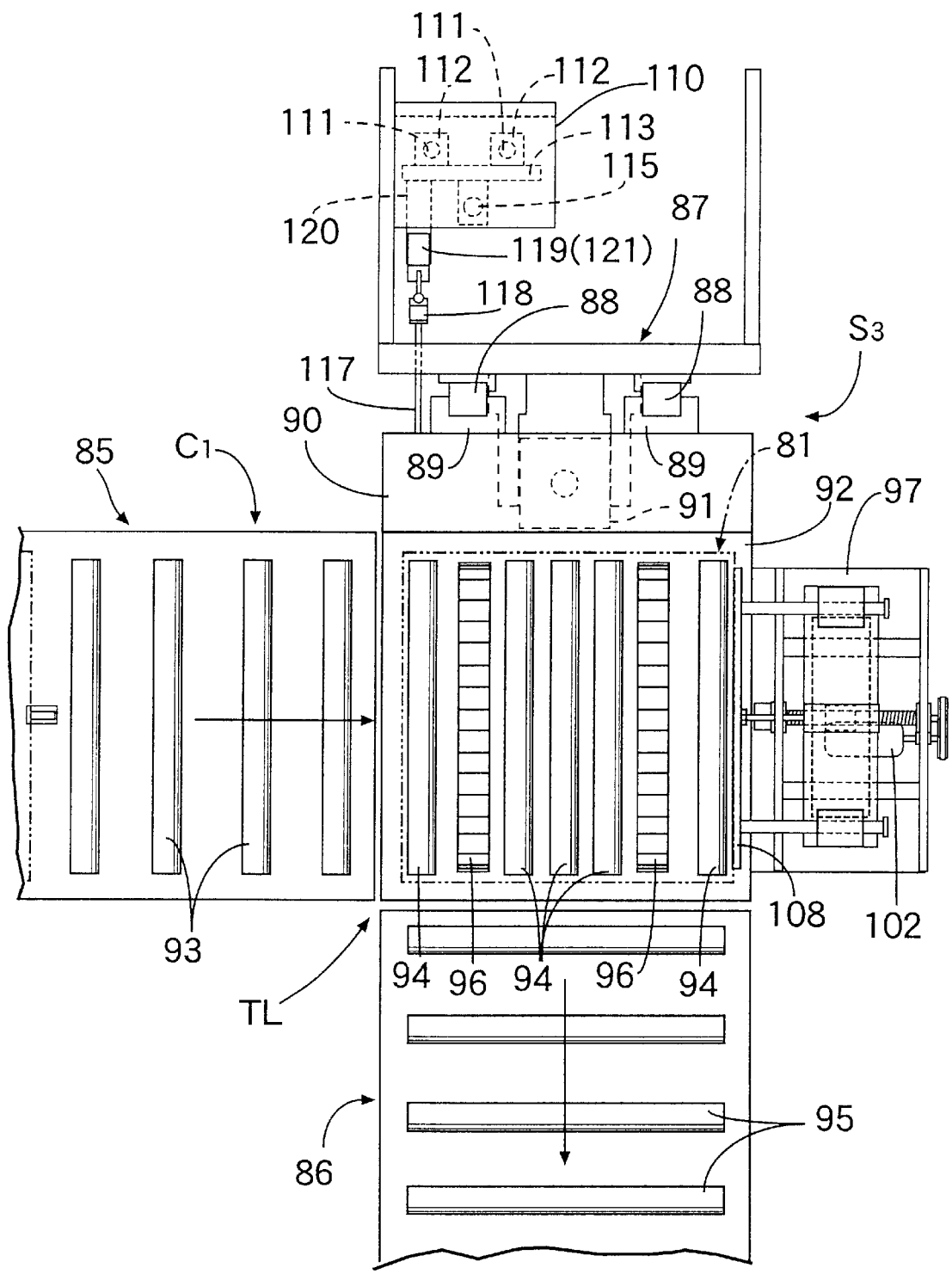

As shown in FIGS. 10 to 12, the pallet 81 for transporting the subassembly A loaded thereon to the first transferring station $S_3$ is comprised of a base 82 supported on the first conveyor $C_1$, a support pillar 83 rising on the base 82, and a support plate 84 mounted at an upper end of the support pillar 83 for supporting the subassembly A. The first conveyor $C_1$ includes a first transporting passage 85 for supplying the pallet 81 having the subassembly A loaded thereon to the first transferring station $S_3$, and a second transporting passage 86 for discharging the pallet 81 which has transferred the subassembly A to the second conveyor $C_2$ and has had the subassembly A removed, from the first transferring station $S_3$. A table lifter TL is mounted between the first and second transporting passages 85 and 86 perpendicular to each other.

The table lifter TL includes a lift base 90 supported on a pair of guide rails 88, 88 vertically fixed to a support wall 87 with slide guides 89 interposed therebetween. The lift base 90 is connected to a cylinder 91 and lifted and lowered by the cylinder 91. Mounted on an upper surface of a lift table 92 extending sideways from the lift base 90 are five transporting rollers 94 disposed in the same transporting direction as transporting rollers 93 on the first transporting passage 85, and two transporting chains 96, 96 disposed in the same transporting direction as transporting rollers 95 on the second transporting passage 86. The two transporting chains 96, 96 are liftable and lowerable by a drive source which is not shown, and transporting surfaces of the transporting chains 96, 96 are lower in level than the transporting surfaces of the five transporting rollers 94 upon lowering of the transporting chains 96, 96, and higher in level than the transporting surfaces of the five transporting rollers 94 upon lifting of the transporting chains 96, 96.

Figure 16:
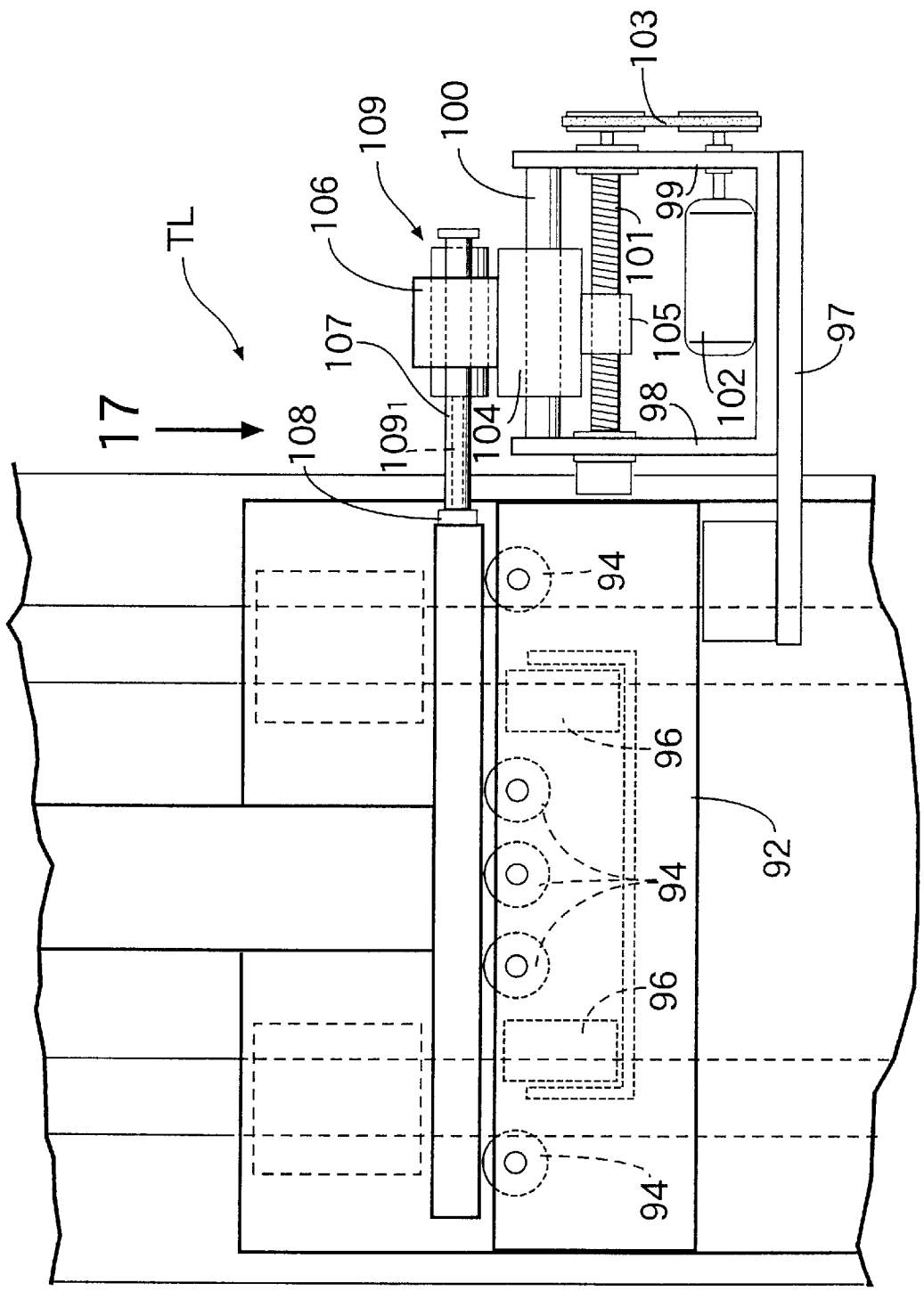
Figure 17:
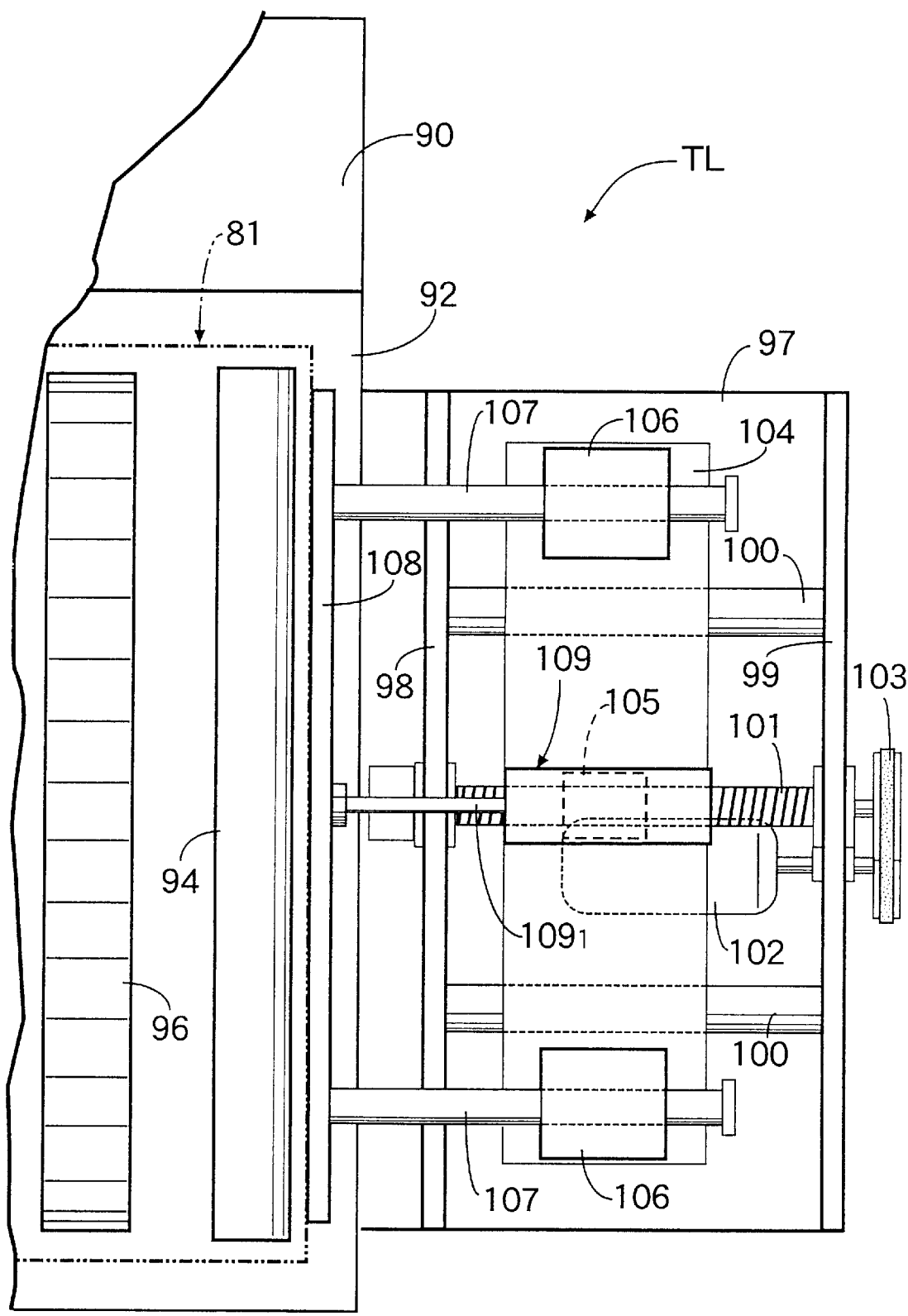

As can be seen from FIGS. 16 and 17, a pair of support walls 98 and 99 are raised on a bracket 97 protruding sideways from the lift table 92, and two guide rods 100, 100 and a single ball screw 101 are laid between both of the support walls 98 and 99. The ball screw 101 is rotated through an endless belt 103 by a motor 102. A slide member 104 is slidably carried on the two guide rods 100, 100, and a nut member 105 is mounted on a lower surface of the slide member 104 and threadedly fitted over the ball screw 101. Therefore, when the ball screw 101 is rotated by the motor 102, the position of the slide member 104 can be changed along the guide rods 100, 100.

Guide rods 107, 107 are slidably carried in a pair of guide tubes 106, 106 mounted on an upper surface of the slide member 104, and a stopper plate 108 mounted at tip ends of the guide rods 107, 107 is connected to a damper 109 mounted on the upper surface of the slide member 104 through a damper rod $109_1$. The stopper plate 108 is opposed to the first transporting passage 85 of the first conveyor $C_1$ and capable of being put into abutment against the base plate 82 of the pallet 81 transferred from the first transporting passage 85 onto the lift table 92.

As can be seen from FIG. 11, two guide rods 111, 111 are vertically fixed to a support plate 110 mounted on a back of the support wall 87, and a slide member 113 is supported on the guide rods 111, 111 with slide guides 112 interposed therebetween. A nut member 116 mounted on the slide member 113 is threadedly fitted over a ball screw 115 which is vertically supported on the support plate 110 and rotated by a motor 114. A dog 118 is supported on the lift base 90 with a bracket 117 interposed therebetween. A movable limit switch 119 operated by the dog 118 is supported on the slide member 113 with a bracket 120 interposed therebetween, and a stationary limit switch 121 operated by the dog 118 is supported on the support wall 87.

The end of the lowering movement of the lift table 92 is controlled by stopping the contraction of the cylinder 91 upon contacting of the stationary limit switch 121 by the dog 118, and the end of the lifting movement of the lift table 92 is controlled by stopping the expansion of the cylinder 91 upon contacting of the movable limit switch 119 by the dog 118. When the lift table 92 is at the lowering movement end, the level of the transporting surface of the lift table 92 coincides with the level of the transporting surface of the first conveyor $C_1$. If the level of the movable limit switch 119 is changed by the motor 114, the end of lifting movement of the lift table 92 can be changed.

When the motorcycle V is transferred from the pallet 81 of the first conveyor $C_1$ onto the hanger H of the second conveyor $C_2$, the longitudinal position of the stopper plate 108 and the level of the movable limit switch 119 are controlled in accordance with previously stored type data of the motorcycle V.

The operation of the embodiment of the present invention having the above-described arrangement will be described below.

Figure 18:
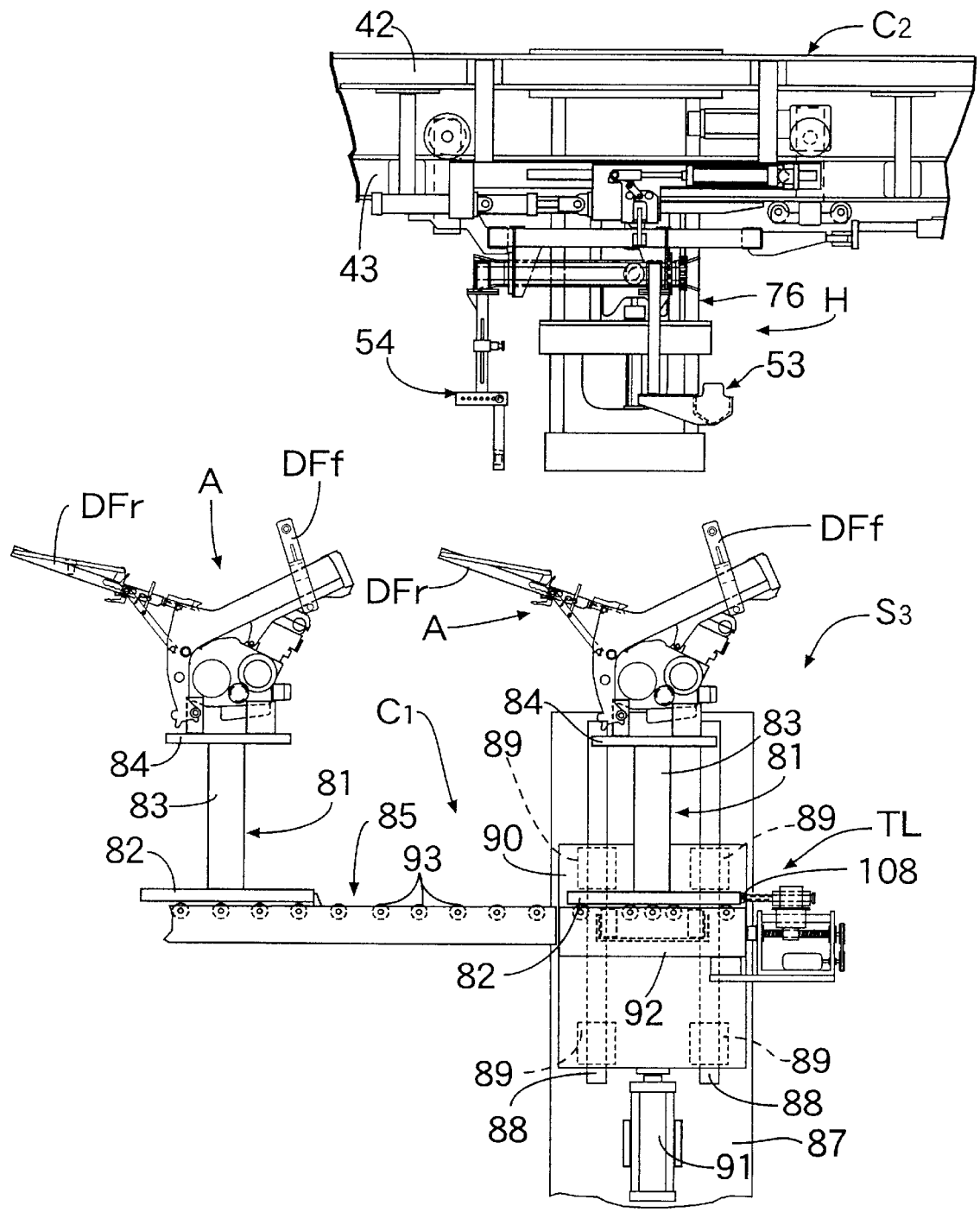

When the pallet 81 having the subassembly A loaded thereon, is transported on the transporting rollers 93 on the first transporting passage 85 of the first conveyor $C_1$ toward the first transferring station $S_3$, as shown in FIG. 18, the cylinder 91 of the table lifter TL mounted on the first transferring station S₃ is in a contracted state, and the transporting rollers 94 of the lift table 92 which has been lowered by contact of the stationary limit switch 121 by the dog 118 mounted on the lift base 90 (see a dashed line in FIG. 11), are arranged in a line at the same level as the transporting rollers 93 on the first transporting passage 85.

When the pallet 81 is transferred from the transporting rollers 93 on the first transporting passage 85 of the first conveyor C₁ onto the transporting rollers 94 of the lift table 92 and advanced, as shown in FIG. 16, the pallet 81 is brought into abutment against the stopper plate 108 and stopped. When the pallet 81 has been brought into abutment against the stopper plate 108, the guide rods 107, 107 are guided by the guide tubes 106, 106, whereby the stopper plate 108 is retracted and thus, the damper 109 connected to the stopper plate 108 is contracted to absorb the shock. The damper 109, after absorption of the shock, is expanded to its original position, thereby stopping the pallet 81 correctly in a predetermined stop position.

Prior to the positioning of the pallet 81, the motor 102 is operated in accordance with type data of the subassembly A of the motorcycle V loaded on the pallet 81, and the position of the slide member 104 slidably carried on the guide rods 100, 100, is adjusted longitudinally through the ball screw 101 and the nut member 105. Therefore, the position of the stopper plate 108 mounted on the slide member 104 is adjusted longitudinally in accordance with the type data of the subassembly A. Hence the longitudinal position of the subassembly A on the stopped pallet 81 can be determined correctly with respect to the hanger H of the second conveyor C₂.

While the pallet 81 of the first conveyor C₁ is being positioned on the lift table 92 of the table lifter TL in the above manner, the hanger H of the second conveyor C₂ for supporting the motorcycle V in the hung-down manner, is supplied to the first transferring station S₃ and stopped thereon. At this time, one of the pair of left and right guide rollers 57, 57 of the hanger H are rolled into the guide rail 75 and hence, when the swinging cylinder 74 is expanded from a state shown in FIG. 11 to a state shown in FIG. 19, the guide rail 75 is swung upwards along the arcuate guide grooves 71₁, 71₁. Therefore, the one guide roller 57 engaged with the guide rail 75 is urged upwards, and the pivots 50, 50 are turned in opposite directions along with the left and right roller support shafts 55, 55 operated in operative association with each other through the interlocking gears 56, 56. As a result, the support portions 53₁, 53₁; 54₁, 54₁ of the front and rear support arms 53, 53; 54, 54 fixed to the pivots 50, 50 are opened outwards (see FIG. 19).

In parallel to this, the clamping cylinder 69 mounted on the slide plate 64, is expanded to close the clamp arms 66 and 67, thereby clamping the engaged projection 70 of the hanger H between the clamp arms 66 and 67. As a result, the hanger H positioned longitudinally is fixed correctly immediately above the pallet 81 on the lift table 92 of the table lifter TL lying at its lower position (see FIG. 13).

Then, the cylinder 91 is expanded to lift the lift table 92 along the guide rails 88, 88 and to stop the lift table 92 in a position in which the dog 118 contacts the movable limit switch 119. The level of the movable limit switch 119 has been previously adjusted by the motor 114 in accordance with the type data of the motorcycle V and hence, the lifting movement end at which the lift table 92 is stopped can be adjusted to a level suitable for the type of the motorcycle V (see FIG. 19).

Figure 19:
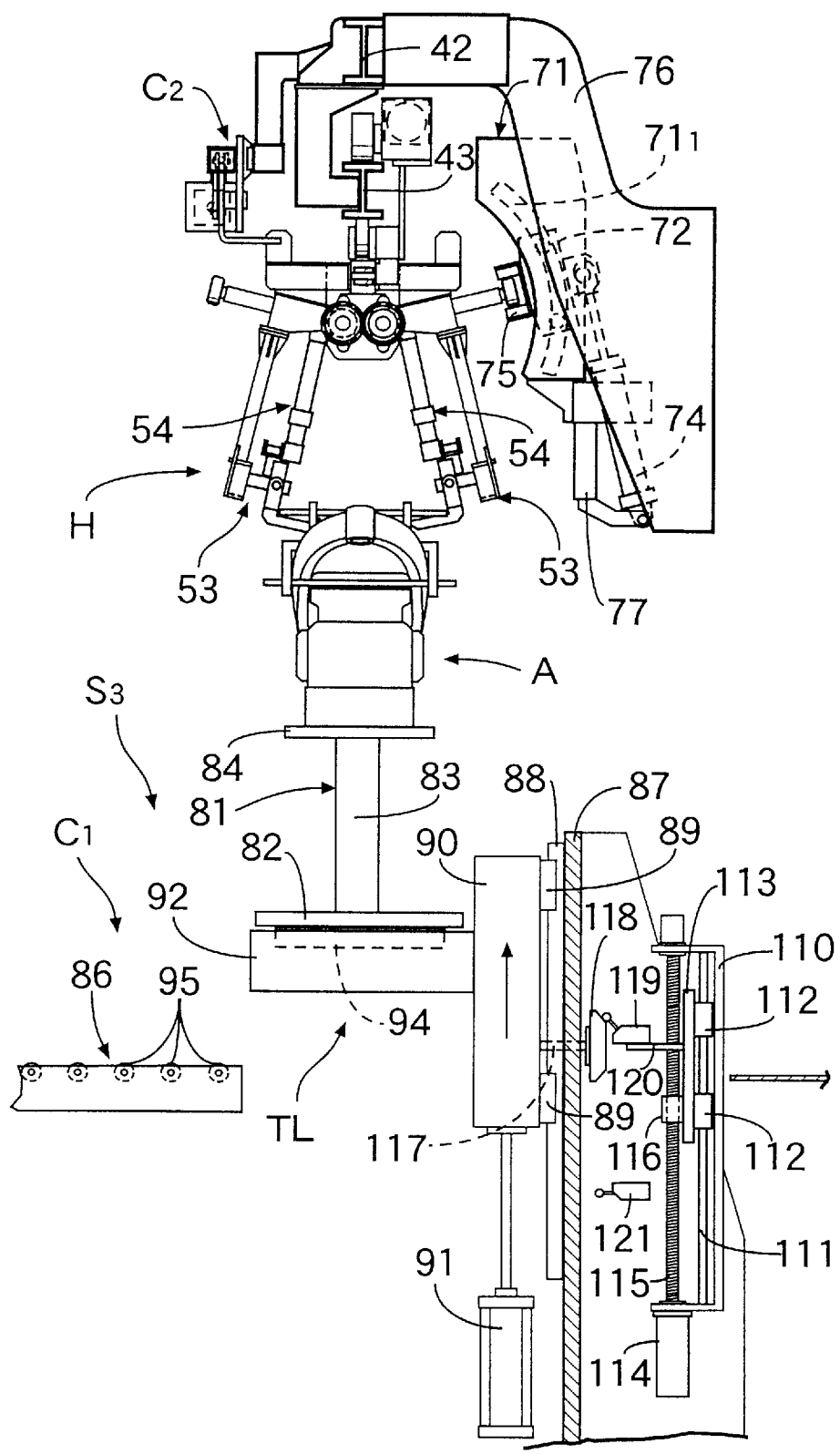

When the pallet 81 having the subassembly A supported thereon has been stopped at the lifting movement end along with the lift table 92 in the above manner, the swinging cylinder 74 is contracted from the state shown in FIG. 19 to the state shown in FIG. 11, whereby the guide rails 75 are swung downwards along the arcuate guide grooves 71₁, 71₁. As a result, the one guide roller 57 engaged with the guide rail 75 is urged downwards, and the pivots 50, 50 are turned in the opposite directions along with the left and right roller support shafts 55, 55 operated in operative association with each other through the interlocking gears 56, 56. Therefore, the support portions 53₁, 53₁ and 54₁, 54₁ of the front and rear support arms 53, 53 and 54, 54 fixed to the pivots 50, 50, are closed inwards to clamp the front and rear dummy frames DFf and DFr (see FIGS. 10 and 11).

As described above, when the subassembly A of the motorcycle V is transferred from the pallet 81 of the first conveyor C₁ to the hanger H of the second conveyor C₂, the adjustments of the longitudinal position and lifting distance of the subassembly A are carried out in accordance with the type data of the motorcycle V. Therefore, the subassembly A can be transferred correctly onto the hanger H without need for an operator's labor and in addition, the damage to the subassembly A can be prevented.

Moreover, since the front and rear dummy frames DFf and DFr are mounted on the subassembly A, the subassembly A can be supported reliably in a stable attitude on the hanger H of the second conveyor C₂ without damaging of the subassembly A, and thus, it is possible to enhance the operability of assembling of the radiator R, the front fork unit FUf, the rear fork unit FUr, the exhaust unit EU and the like to the subassembly A. Further, it is possible to accommodate to the plurality of types of motorcycles V by using one type of the pallet 81, thereby contributing to a reduction in cost.

When the subassembly A of the motorcycle V has been transferred from the pallet 81 of the first conveyor C₁ onto the hanger H of the second conveyor C₂ in the above manner, the cylinder 91 of the table lifter TL is contracted to lower the lift table 92 to the position shown by the dashed line in FIG. 11. Then, when the two transporting chains 96, 96 mounted on the lift table 92 are driven in states in which they have been lifted slightly to float the base plate 82 of the empty pallet 81 from the transporting rollers 94, the pallet 81 is driven away from the lift table 92 onto the transporting rollers 95 on the second transporting passage 86 of the first conveyor C₁.

As discussed above, the distance between the plurality of mounting portions provided on the hanging-down jig detachably coupled to the vehicle body frame for the motorcycle can be adjusted. Therefore, the one type of the hanging-down jig can be used commonly for vehicle body frames for a plurality of types of motorcycles by adjusting the distance between the mounting portions in accordance with the size of the vehicle body frame for each of the motorcycles, leading to enhanced general-purpose properties.

The positions of the support portions of the pair of support arms openably and closably provided on the hanger of the overhead conveyor can be adjusted. Therefore, even if the position and attitude of mounting of the hanging-down jig are varied depending on the type of the motorcycle, the positions of the support portions of the support arms with respect to the hanging-down jig can be adjusted by adjusting such position in accordance with the size of the vehicle body frame for each of the motorcycles, whereby the vehicle body frame can be hung down and supported in a stable attitude.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A motorcycle hanging-down jig for supporting a vehicle body frame of a motorcycle in a hung-down manner on a hanger of an overhead conveyor, the hanger comprising a support arm, said hanging-down jig comprising a plurality of mounting portions detachably coupled to the vehicle body frame and a hanging-down portion for engagement with the support arm of the hanger of the overhead conveyor, wherein the distance between said mounting portions is adjustable wherein the mounting portion includes a front dummy frame and a rear dummy frame.

2. An overhead conveyor apparatus comprising:

a hanger having a pair of support arms, for hanging-down and transporting a vehicle body frame for a motorcycle, a hanging-down jig mounted thereon, the hanging-down jig including a plurality of mounting portions detachably coupled to the vehicle body frame and a hanging-down portion engaged with the support arms of the hanger of the overhead conveyor, wherein the distance between said mounting portions is adjustable, wherein the pair of support arms are openably and closably provided on the hanger, the support arms having support portions for engaging the hanging-down portion of the hanging-down jig, and wherein the positions of the support portions with respect to the bodies of the support arms are adjustable wherein the mounting portion includes a front dummy frame and a rear dummy frame.

3. An overhead conveyor apparatus as set forth in claim 2, wherein the support portions of the support arms are on the lower portion of the support arms.

4. An overhead conveyor apparatus as set forth in claim 2, wherein the hanger includes pivots and front and rear support arms extending from the pivots wherein the front support arm engages the front dummy frame and the rear support arm engages the rear dummy frame.

5. An overhead conveyor apparatus as set forth in claim 4 wherein the position where the rear support arm engages the rear dummy frame is adjustable.

* * * * *